Aug. 16, 1927.
R. N. KIRCHER
1,639,093
COVER INDEXING DEVICE AND FASTENER FOR COOKING UTENSILS
Filed April 13, 1927
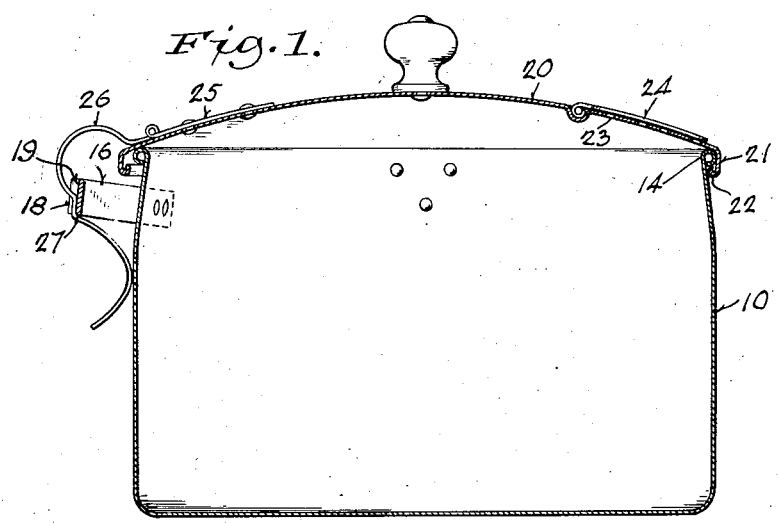
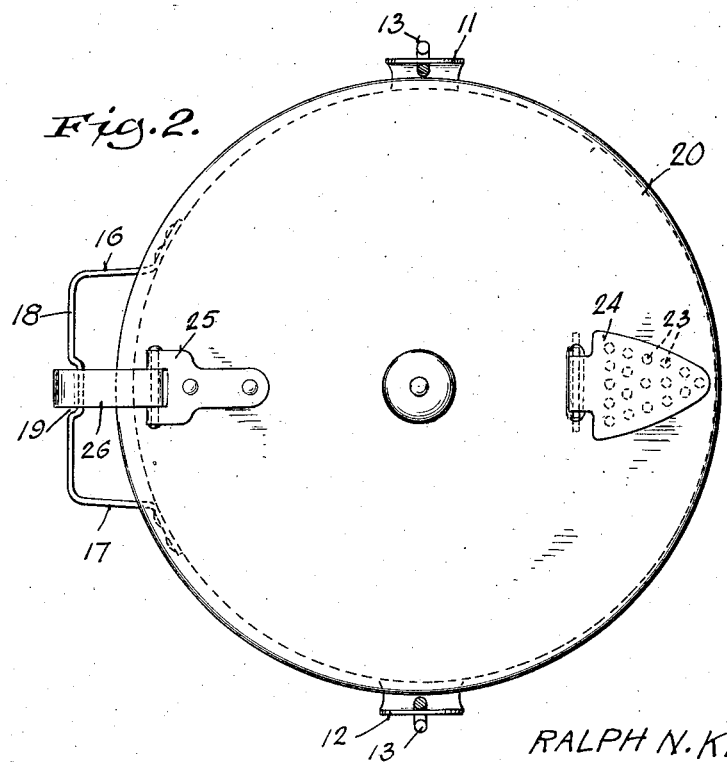
WITNESS:
INVENTOR.
RALPH N. KIRCHER,
BY
ATTORNEYS.

Patented Aug. 16, 1927.

1,639,093

UNITED STATES PATENT OFFICE.

RALPH N. KIRCHER, OF WEST BEND, WISCONSIN, ASSIGNOR TO WEST BEND ALUMINUM COMPANY, OF WEST BEND, WISCONSIN, A CORPORATION OF WISCONSIN.

COVER INDEXING DEVICE AND FASTENER FOR COOKING UTENSILS.

Application filed April 13, 1927. Serial No. 183,546.

This invention relates to an improvement in cooking utensils or vessels, and it involves a novel means for positioning and retaining the cover upon such a vessel. It involves also a peculiar and novel form of handle attached to the vessel, the handle being so formed that by co-operation therewith, of a spring catch attached to the cover of the vessel, such cover is always accurately positioned upon the vessel.

The vessel in connection with which the present invention is particularly designed for use, is one in which the cover is provided with a pouring orifice, over which normally reposes a pivoted plate for covering the said orifice. Such vessel being provided with a usual bail, it is desired that the pouring orifice in the cover be located at a point on the side of the vessel which is midway between the bail ears. To insure such positioning of the pouring orifice, the spring catch which is attached to the cover, engages a notch formed in the handle attached to the opposite side of the vessel, the notch in the handle forming a fixed guide for indexing the cover in its proper position upon the vessel.

The rim surrounding the open upper end of the vessel is adapted to be engaged in the region of the pouring orifice in the cover, by a bead or rib formed interiorly at the lower edge of the downturned flange of the cover, such engagement at that point being effected by the expansive action of the spring catch, attached to the cover at its opposite point. This construction permits the vessel to be suspended and tilted, so that the vessel may be drained of the water used in cooking, without removing the cover or spilling the other contents thereof, inasmuch as the cover is firmly retained in position during the draining operation.

The construction of my invention will now be described, and the novelty thereof pointed out in the appended claims.

In the accompanying drawing:

Figure 1 is a central vertical sectional view through the vessel, its cover and specially formed handle of the vessel.

Fig. 2 is a plan view of the vessel with the cover thereof, and the handle and spring catch, showing how the handle and catch co-operate to properly index the pouring orifice at the opposite side of the vessel.

In the drawing, the numeral 10 indicates a cooking vessel of usual form provided with oppositely placed ears 11 and 12, which are engaged by a lifting bail 13, shown in Fig. 2 as cut off just above the said ears. The rim at the top of the vessel is finished by turning it outwardly so as to form a circumferential bead 14.

The handle 15 is attached to the outer side of the vessel 10 near its top and at a point equi-distant from the ears 11 and 12. The said handle is of loop formation, its feet being attached to the vessel, while its spaced legs 16 and 17 are connected by a bar or bridge piece 18, the latter being shown as straight, and notched or indented as at 19 by displacing the metal thereof toward the vessel.

The vessel is provided with a cover 20 having at its margin a depending flange 21, inturned at its lower edge to form a bead or rib 22, which latter is adapted to engage under the bead 14 on the vessel, and serve to lock the cover on the vessel at the point of engagement. The cover is provided at a point near its edge with a pouring orifice 23, formed as one or a plurality of openings, which orifice is adapted to be normally closed by a plate 24, hinged to the top of the cover. Directly opposite the pouring orifice, a bracket 25 is attached to the cover. To the outer end of the said bracket, one end of a spring catch 26 is pivoted, the latter being formed as a resilient metal strap, curved in the manner shown in Fig. 1, and provided at a point between its hinged and free ends with a shoulder 27, which latter is adapted to take under the lower edge of the bar 18 of the handle 15, when the spring catch is pressed into the position shown in the drawing. The spring catch is designed to enter the notch or depression 18 in the handle 15, and act as a means for indexing accurately the position of the pouring orifice at the opposite side of the vessel.

When operated as described, the spring catch serves to retain the cover upon the vessel at the near or contiguous side, while the expansive action of the spring catch acts to engage the bead 22 on the flange of the cover with the bead or rib 14 on the vessel, thus firmly securing the cover upon the vessel at two opposite points, and preventing displacement of the cover when the vessel suspended by its bail is tilted by lifting on the handle 15 to pour the accumulation of water out of the vessel. Normally, the hinged plate 24 will lie in close engagement with the cover 12.

Having thus described my invention, what I claim and desire to secure by Letters Patent of the United States, is:

1. In a cooking utensil, a vessel and a cover therefor, means for securing and indexing the cover in position upon the vessel, such means comprising a handle on the vessel having a notch in the bar thereof, and a spring catch attached to the cover and engaging the handle in the said notch.

2. In a cooking utensil, a vessel and a cover therefor, means for securing and indexing the cover in position upon the vessel, such means comprising a handle on the vessel having a notch in the bar thereof, and a spring catch pivotally mounted upon the cover and adapted to resiliently engage the handle in the said notch, with engaging means between the vessel and cover at the opposite point.

3. In a cooking utensil, a vessel and a cover therefor, the latter having a pouring orifice, means for engaging the cover with the vessel in the region of the pouring orifice, means for engaging the cover with the vessel at the opposite point, such last mentioned means comprising a notched handle upon the vessel, a spring catch upon the cover adapted to engage the notch in the handle, and thus index the pouring orifice correctly.

In testimony whereof, I have signed my name at West Bend, Wisconsin, this 8th day of April, 1927.

RALPH N. KIRCHER.